March 7, 1939.  E. C. DAMROW  2,149,956

FILTERING APPARATUS

Filed Oct. 5, 1936  2 Sheets-Sheet 1

Inventor:
Edward C. Damrow
By Charles & French
Attys.

March 7, 1939. E. C. DAMROW 2,149,956
FILTERING APPARATUS
Filed Oct. 5, 1936 2 Sheets-Sheet 2
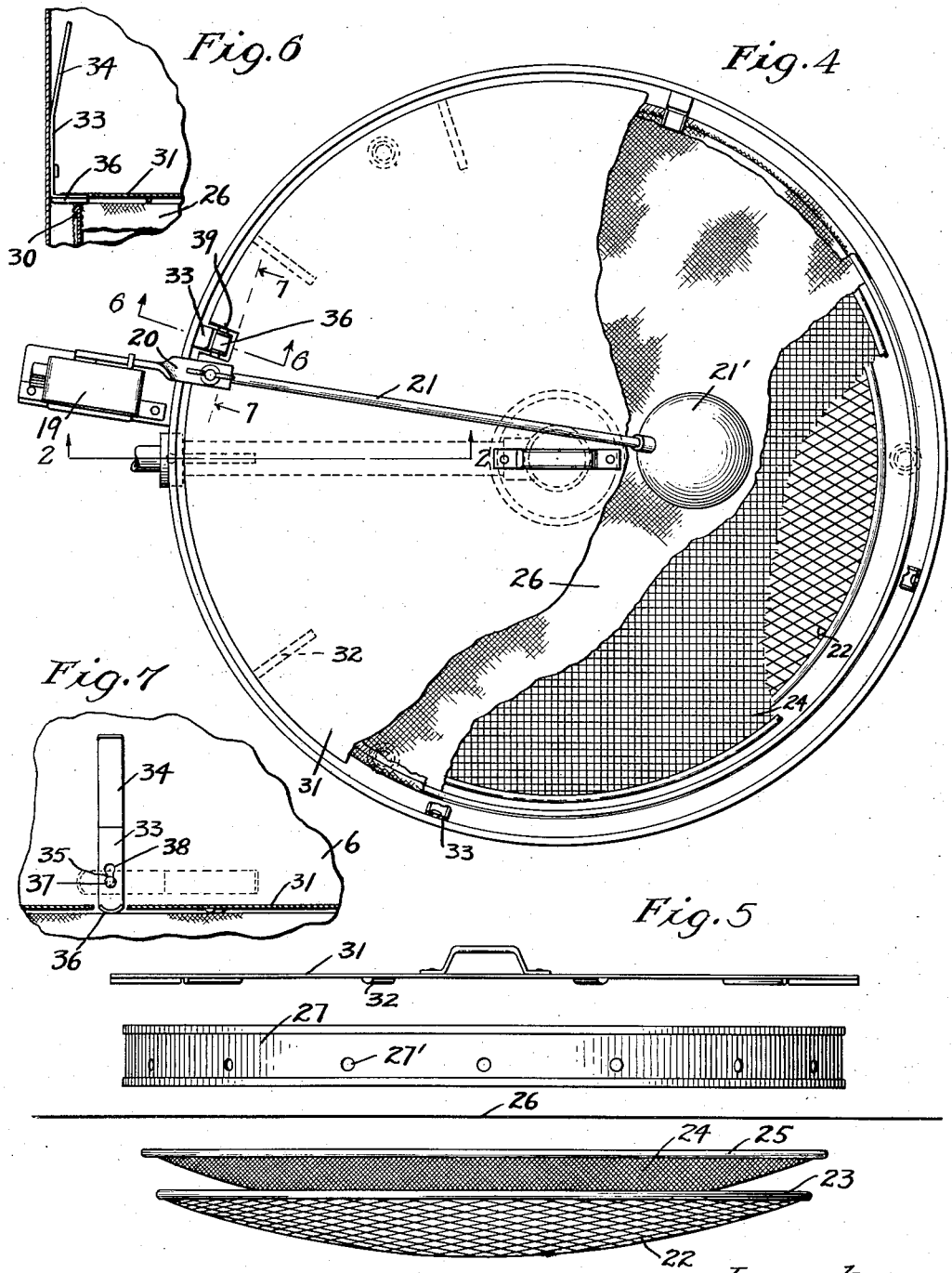
Inventor:
Edward C. Damrow
By Quarles & French
Attys.

Patented Mar. 7, 1939

2,149,956

UNITED STATES PATENT OFFICE 2,149,956

FILTERING APPARATUS

Edward C. Damrow, Fond du Lac, Wis., assignor to Damrow Brothers Company, Fond du Lac, Wis., a corporation of Wisconsin Application October 5, 1936, Serial No. 103,989

9 Claims. (Cl. 210—149)

The invention relates to liquid filters, more particularly milk filters.

One of the objects of the invention is to provide a filtering apparatus which will not plug up with butterfat. According to the present invention an automatic float operated switch controls the pump, and by it a certain head of milk is always maintained above the filter cloth which prevents butterfat and foam from depositing on and clogging said cloth.

A further object of the invention is to provide a filtering apparatus in which the filter cloth is mounted at the bottom of the tank and efficiently supported therein through it may be readily removed for renewal or cleaning purposes.

A further object of the invention is to provide a filtering apparatus having a sediment chamber surrounding the entrance end of the filter cloth.

A further object of the invention is to provide a clamping ring which seals the filter cloth into the filter so no unfiltered milk can pass and which cooperates with clamping means to hold the upper portion of the filter cloth in place adjacent the sediment chamber.

A further object of the invention is to provide a plate supported by said clamping ring and acting as a baffle to break the fall of incoming milk and direct it into the sediment chamber.

A further object of the invention is to provide a filter having a large filtering surface so that the velocity of the milk is low so that it does not disturb any dirt once deposited on the cloth and does not have an erosive action on deposited dirt, and the milk is not forced through the filter but is drawn through it by the suction effect of the pump.

A further object of the invention is to provide a milk filter of simple construction in which all parts are easily accessible for cleaning and one that is automatic in operation, the pump only operating when there is milk to be filtered.

The invention further consists in the several features hereinafter set forth and more particularly defined by claims at the conclusion hereof.

In the drawings:

Fig. 4 is an elevation view of the apparatus, parts being broken away;

Fig. 5 is an exploded view of parts of the filter;

Fig. 6 is a detail sectional view taken on the line 6—6 of Fig. 4;

Fig. 7 is a detail sectional view taken on the line 7—7 of Fig. 4.

Figure 1:
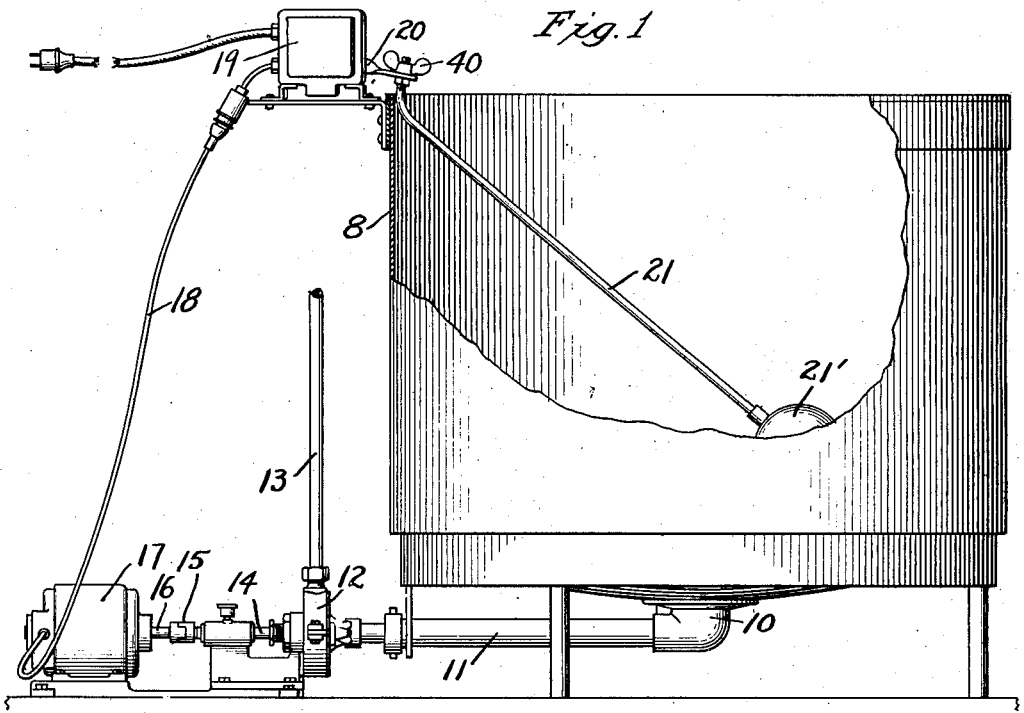
Fig. 1 is a side elevation view of a filtering apparatus embodying the invention, parts being broken away.
Figure 2:
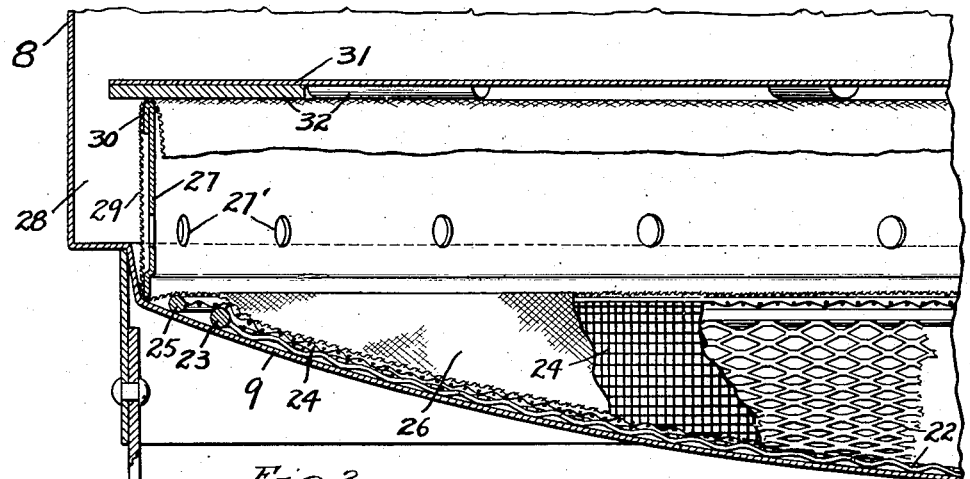
Fig. 2 is a detail vertical sectional view through the lower portion of the tank, parts being broken away.
Figure 3:
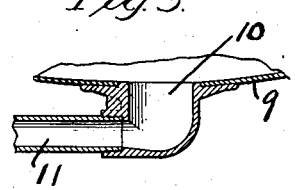
Fig. 3 is a detail vertical sectional view of the discharge outlet.

Referring to the drawings, the numeral 8 designates a tank or vat having a conically inclined bottom 9 provided with a centrally disposed outlet 10 connected by a pipe 11 with the suction inlet of a pump 12 whose discharge communicates with a pipe 13.

The pump 12 of any suitable construction may be driven from any suitable source of power and is here shown as having its drive shaft 14 connected by a flexible coupling 15 with the shaft 16 of an electric motor 17 receiving current through the supply line 18. A control switch 19 of any suitable construction and hence not shown in detail controls the flow of current through said line 18 to said motor, and the operating arm 20 for said switch is here shown as detachably connected to the float lever 21 which projects down into the tank 8 and has the hollow ball float 21' mounted thereon. With this arrangement when the head of milk introduced into the tank 8 from the upper end thereof drops to a certain level, the float drops and opens the switch 19 to the motor 17 and thus stops said motor and the pump 12, but as long as there is a sufficient head of milk above the bottom of the tank, the float acts to keep the switch 19 closed. Thus the pump only runs while there is milk to be treated, and at the same time a sufficient head of milk is maintained above the filtering cloth hereinafter described to prevent buterfat and foam from clogging said cloth.

A supporting and spacing coarse meshed screen member 22 is formed to fit or rest on the conical bottom of the tank 8, said screen preferably being formed of expanded metal lath which is secured at its upper end to a ring frame member 23. This screen acts as a support and spacer for a fine heavy mesh filter cloth supporting screen 24 which rests thereon and has a ring frame member 25 resting on the conical bottom of said tank.

The fine mesh filter cloth 26 rests upon the top of the screen 24 and is held down adjacent the upper edge of said screen by the lower edge of a relatively heavy metal clamping ring 27 which, clamping the cloth between it and the bottom of the tank, is supported by the tank.

The diameter of the clamping ring 27 is such that it is spaced from the side wall of the tank 8 to form an annular sediment collecting chamber 28, and the sides of said ring have a plurality of large radially spaced holes 27' through which the milk can flow from the sediment chamber after passing through an annular side wall extension 29 of the filter cloth. This extension of the filter cloth is brought up on the outside of the ring 27 and lapped over the top edge 30 of said ring and is held in position thereon by a baffle plate 31 of circular form whose outer edge projects beyond the ring, the plate itself being spaced a short distance from the top of the ring by semi-cylindrical radially disposed blocks 32 secured to the lower surface of said plate adjacent its outer edge.

While the weight of the ring 27 and the plate 31 on the lower clamped edge of the cloth acts to exert a clamping pressure thereon and the weight of said plate 31 on the upper edge of said cloth acts to clamp it to the upper edge of the ring, additional clamping means are preferably provided for exerting a clamping pressure on the cloth and ring which are here shown as a plurality of radially spaced clamping members 33. Each of these members 33 are in the form of levers having an inwardly bent handle portion 34, an intermediate portion provided with a key slot 35 and an inwardly extending foot portion 36. A beaded pivot pin 37 for each clamp is mounted in the tank wall and projects inwardly in a plane somewhat above that of the upper edge of the ring as shown more particularly in Figs. 6 and 7. The upper enlarged end 38 of the key slot 35 permits the head of the pin 37 to be slipped therethrough, and then the shank of said head may be moved to a pivoting engagement with the end of the reduced portion of the slot 35. The clamps are preferably applied by connecting them with their pivot pins while in a horizontal position as shown in Fig. 7, and then by swinging them to the full line vertical position the foot portion 34 of the clamps, whose surface 36 is curved, exerts a wedging action between the part being clamped and its pivot so that the foot presses down upon the top of the ring 27 and the filter cloth thereover and acts to clamp this edge of the cloth to the ring and at the same time urges the lower edge of the ring 27 into clamping engagement with the cloth interposed between it and the bottom portion. With the clamps in an upright position the baffle plate 31 may be removed when desired without interference as slots 39 are cut in the baffle plate to allow clearance for the clamps.

With this construction when the filtering parts are in assembled position in the tank, the milk to be filtered is introduced into the tank from the top, and after a sufficient quantity has been supplied to the tank to raise the float lever 21, the pump 12 is started in the manner heretofore described, and the milk after passing through the filter cloth 26 is drawn out of the bottom of the tank through the pipe 11 and then forced by the pump through the pipe 13 to a vat or other place of use or storage. As the milk is introduced into the tank, any heavy particles such as pieces of ice, butterfat, etc., strike the baffle plate 31. Furthermore, this plate 31 breaks the fall of the incoming milk, and as the area of the tank is large compared to that of the incoming stream, the velocity of the incoming milk stream is quickly lowered to a low value so that the milk does not have an erosive action on any dirt that might be deposited on the filter cloth. Furthermore, the sediment collecting chamber or space 28 into which the incoming milk is deflected by the plate 31 permits coarse sediment to be washed into this pocket and thus relieves the main body of the filter cloth of taking care of this objectionable material. As there is always, during operation, a head of milk above the filter cloth maintained through the action of the float controlled switch 19, the butter fat and foam in the milk is kept above the bottom of the tank and prevented from depositing on and clogging the filter cloth. At the end of a run the float lever 21 may be disconnected from the switch arm 20 by release of the wing nut 40 and the switch closed until the pump has drawn out the milk remaining in the tank. After the milk has been removed from the tank, the filter may be flushed out very easily with a small amount of water.

While I have shown the filter cloth extending over the top of the ring, it will be understood that this particular feature while desirable is not essential and that the filter can be assembled with the cloth ending in the sediment pocket without changing the operation of the device as heretofore described as most of the filtering is done after the milk gets into the space formed by the main body of the cloth, the ring 27, and the plate 31.

Removal of the baffle plate 31 and the clamps 33 permit removal of the ring 27, the filter cloth 26, and the screens 24 and 22 for cleaning though after a certain amount of use the filter cloth is, of course, replaced with a new one.

I desire it to be understood that this invention is not to be limited to any particular form or arrangement of parts except in so far as such limitations are included in the claims.

What I claim as my invention is:

1. In a milk filtering apparatus, the combination of a tank provided with a discharge outlet, a pump connected at its suction side to said outlet, a filtering element above said outlet, means for driving said pump, and a float controlled means for controlling said driving means to maintain the level of the milk above said filtering element to prevent its clogging with elements in the milk, such as butterfat and foam.

2. In a milk filtering apparatus, the combination of a tank provided with a discharge outlet, a pump connected at its suction side to said outlet, an electric motor for driving said pump, a source of current for said motor, a control switch for said source of current, a float in said tank operatively connected to said switch to open the same when the level of the milk reaches a predetermined level above said filtering element to maintain a body of milk above said element to prevent its clogging with elements in the milk, such as butterfat and foam.

3. In a milk filtering apparatus, the combination of a tank provided with a bottom discharge outlet, a coarse spacing screen removably mounted on the bottom of said tank above said outlet, a filter cloth supporting screen removably mounted on said spacing screen, a filter cloth mounted over said supporting screen, means for detachably clamping the outer portion of said cloth against a wall of said tank, and means for withdrawing the milk through said outlet.

4. In a milk filtering apparatus, the combination of a tank provided with a bottom discharge outlet, a filter cloth, foraminous supporting means for said cloth mounted at the bottom portion of said tank, an upright apertured clamping ring spaced from the side wall of said tank to provide a sediment chamber and clamping the cloth between its lower edge and a part of said tank, said cloth extending up over the sides of said ring and secured to the upper edge thereof, and means for deflecting the incoming milk into said sediment chamber.

5. In a milk filtering apparatus, the combination of a tank provided with a bottom discharge outlet, a filter cloth mounted at the bottom of said tank and provided with filtering parts spaced from the sides of said tank, means for holding the filter cloth in position, and means for deflecting the incoming milk into the space between the sides of said tank and said filter cloth.

6. In a milk filtering apparatus, the combination of a tank provided with a bottom discharge outlet, a filter cloth, foraminous supporting means for said cloth mounted at the bottom portion of said tank, an apertured clamping ring spaced from the side wall of said tank to provide a sediment chamber and clamping the cloth between its lower edge and a part of said tank, said cloth extending up over the upper edge of said ring, and a baffle plate supported on the upper edge of said ring.

7. In a milk filtering apparatus, the combination of a tank provided with a bottom discharge outlet, a filter cloth, foraminous supporting means for said cloth mounted at the bottom portion of said tank, an apertured clamping ring spaced from the side wall of said tank to provide a sediment chamber and clamping the cloth between its lower edge and a part of said tank, said cloth extending up over the upper edge of said ring, and a baffle plate supported on the upper edge of said ring and extending outwardly beyond the same.

8. In a milk filtering apparatus, the combination of a tank provided with a bottom discharge outlet, a filter cloth, foraminous supporting means for said cloth mounted at the bottom portion of said tank, an apertured clamping ring securing the cloth between its lower edge and a part of said tank, and clamps pivotally mounted on the side wall of said tank for holding down said ring.

9. In a milk filtering apparatus, the combination of a tank provided with a bottom discharge outlet, a filter cloth, foraminous supporting means for said cloth mounted at the bottom portion of said tank, an apertured clamping ring spaced from the side wall of said tank to provide a sediment chamber and clamping the cloth between its lower edge and a part of said tank, said cloth extending over the upper edge of said ring, hold down clamps for said ring and cloth removably mounted on said tank, and a baffle plate mounted on and extending beyond the sides of said ring and slotted to clear said hold down clamps.

EDWARD C. DAMROW.